(12) United States Patent
Michetti et al.

(10) Patent No.: US 12,092,065 B2
(45) Date of Patent: Sep. 17, 2024

(54) POWER GENERATOR

(71) Applicant: ENI S.p.A., Rome (IT)

(72) Inventors: Vincenzo Michetti, San Donato Milanese (IT); Giuliana Mattiazzo, Collegno (IT); Giovanni Bracco, Turin (IT); Fabio Carapellese, Andria (IT); Sergej Antonello Sirigu, Osini (IT); Mauro Bonfanti, Montodine (IT)

(73) Assignee: ENI S.P.A., Rome (IT)

( * ) Notice: Subject to any disclaimer, the term of this patent is extended or adjusted under 35 U.S.C. 154(b) by 0 days.

(21) Appl. No.: 17/782,849

(22) PCT Filed: Dec. 4, 2020

(86) PCT No.: PCT/IB2020/061527
§ 371 (c)(1),
(2) Date: Jun. 6, 2022

(87) PCT Pub. No.: WO2021/111405
PCT Pub. Date: Jun. 10, 2021

(65) Prior Publication Data
US 2023/0008924 A1    Jan. 12, 2023

(30) Foreign Application Priority Data
Dec. 6, 2019    (IT) .......................... 102019000002380

(51) Int. Cl.
*F03B 13/14*    (2006.01)
*F03D 5/00*    (2006.01)

(52) U.S. Cl.
CPC ................ *F03B 13/14* (2013.01); *F03D 5/00* (2013.01)

(58) Field of Classification Search
CPC .................................. F03D 5/00; F03D 13/14
See application file for complete search history.

(56) References Cited

U.S. PATENT DOCUMENTS 11,199,173 B2 * 12/2021 Mattiazzo ............ H02K 7/1892
2004/0103728 A1    6/2004 Hintz
(Continued)

FOREIGN PATENT DOCUMENTS

| CL | 42707 | 9/1997 |
|---|---|---|
| CN | 101113713 A | 1/2008 |

(Continued)

OTHER PUBLICATIONS

International Search Report dated Feb. 3, 2021 from International Patent Application No. PCT/IB2020/061527, 6 pages.
(Continued)

*Primary Examiner* — Sean Gugger
(74) *Attorney, Agent, or Firm* — Ruggiero McAllister & McMahon LLC

(57) ABSTRACT

A wave power generator includes a box-shaped body having an inner chamber containing a first gyroscopic device that includes a first frame hinged to the body around a first axis, a first gyroscope being carried by the first frame in a rotatable manner around a second axis perpendicular to the first axis, a first actuator being carried by the first frame to rotate the first gyroscope around the second axis, and a first converter device that converts rotational mechanical energy into electric energy that is mechanically coupled to the first frame. The first converter device is connected to a stabilizing device. A second gyroscopic device includes a second frame hinged to the body around a third axis transversal to the first axis.

22 Claims, 3 Drawing Sheets

(56) References Cited

U.S. PATENT DOCUMENTS

2009/0322080 A1    12/2009    Ruiz Minguela et al.
2019/0322080 A1    10/2019    Vennerberg et al.

FOREIGN PATENT DOCUMENTS

| CN | 105756847 A | 7/2016 |
|---|---|---|
| DE | 10112184 A1 | 12/1987 |
| DE | 3620171 A1 | 10/2001 |
| EP | 2 438 293 B1 | 5/2013 |
| EP | 2 764 236 B1 | 12/2017 |
| FR | 2 748 563 A1 | 11/1997 |
| FR | 2850948 A1 | 8/2004 |
| JP | 2016-094902 A | 5/2016 |
| WO | 97/43601 A1 | 11/1997 |
| WO | 2014/148946 A1 | 9/2014 |
| WO | 2019/111040 A1 | 6/2019 |

OTHER PUBLICATIONS

Written Opinion dated Feb. 3, 2021 from International Patent Application No. PCT/IB2020/061527, 5 pages.
Chilean Search Report dated Nov. 7, 2023 from corresponding Chile Patent Application No. 202201469, 21 pages.
Chinese First Office Action dated May 22, 2024 from corresponding Chinese Patent Application No. 202080092297.2, 15 pages.

\* cited by examiner

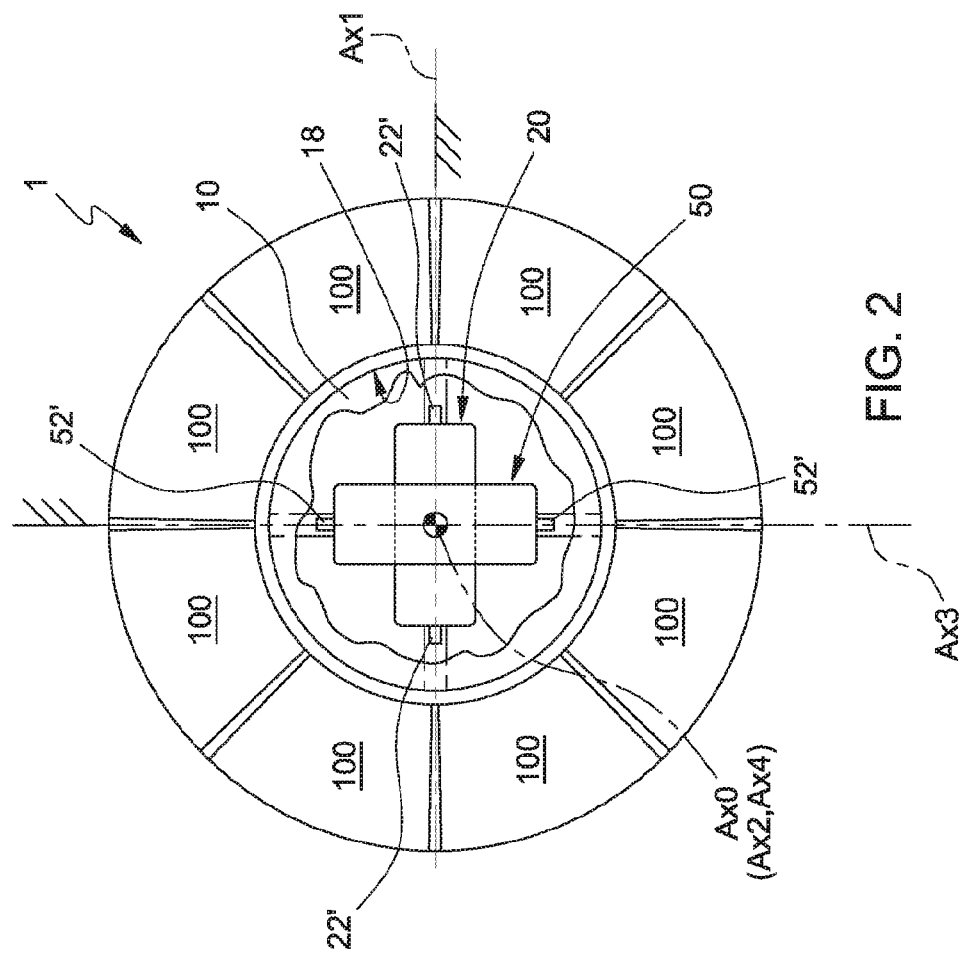
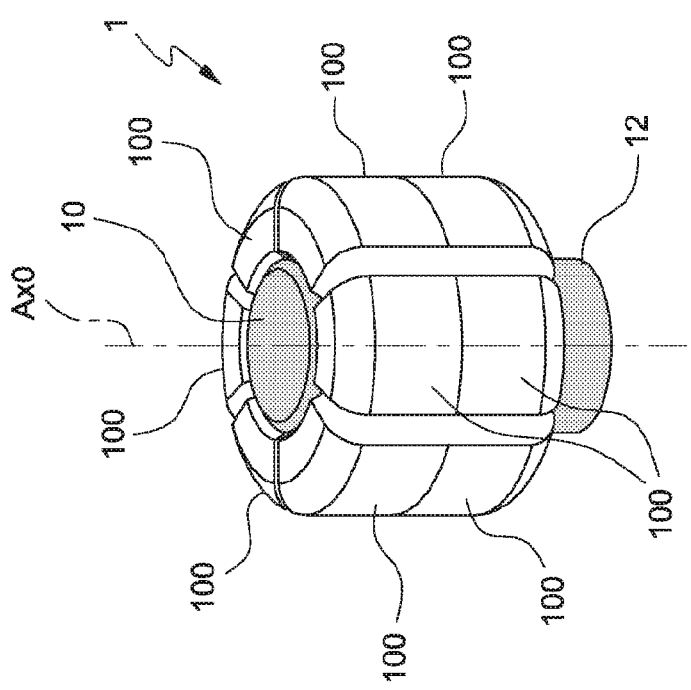
FIG. 2
FIG. 1

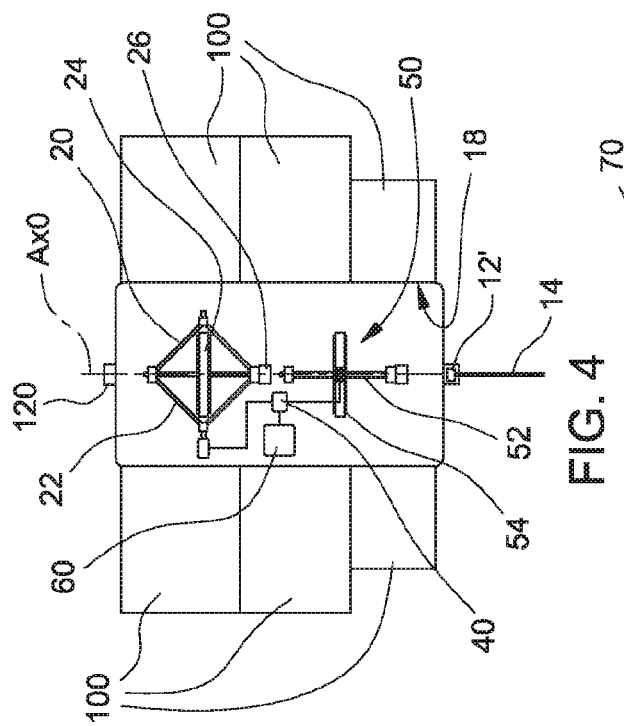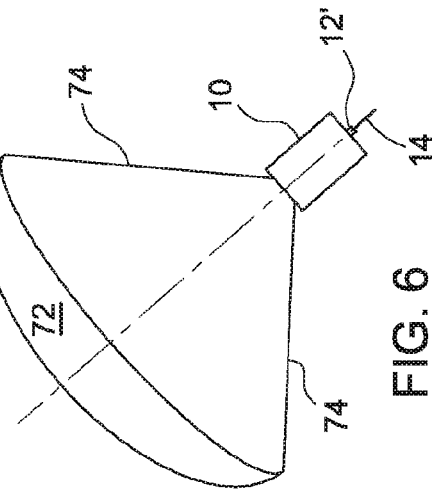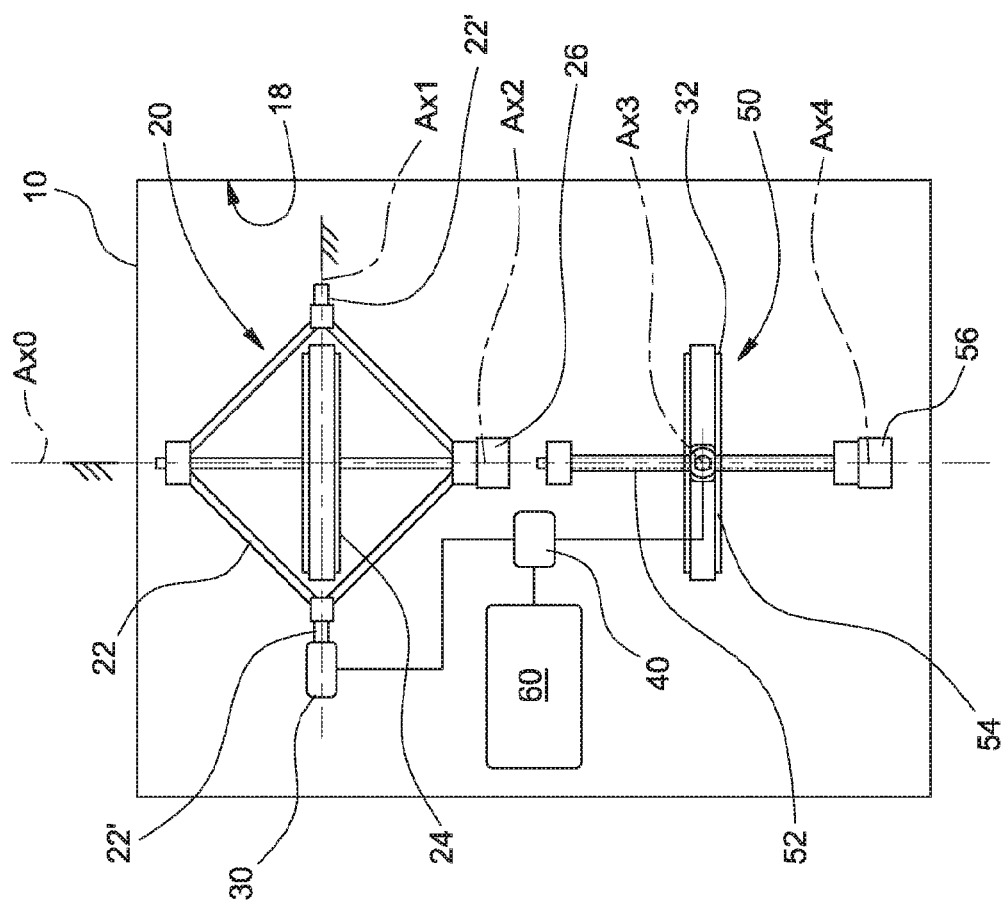

POWER GENERATOR

CROSS-REFERENCE TO RELATED APPLICATIONS

This application is a national stage application, filed under 35 U.S.C. § 371 of International Patent Application No. PCT/IB2020/061527, filed on Dec. 4, 2020, that claims priority from Italian Patent Application No. 102019000023280 filed on Dec. 6, 2019, the entire disclosures of each of which are incorporated herein by reference.

BACKGROUND OF THE DISCLOSURE

1. Field of the Disclosure

The present disclosure relates to a power generator, particularly an electric power generator. In particular, the present disclosure relates to an electric power generator arranged to convert mechanical energy into electric power. More in detail, the present disclosure relates to an electric power generator comprising a hull immersed at least partially in a liquid in order to convert movement mechanical power associated with waves propagating in the liquid into electric power.

2. Description of Related Art

The energy balance of repeatable natural phenomena becomes the object of investigation every day due to the possible economic implications linked to exploitation for the production of electric power. In the following pages, attention is focused on the exploitation of the power of wave motion, or the spontaneous movement of large masses of water, for example, as a consequence of tides, pressure and temperature differences between distinct areas of the atmosphere, and of salinity in neighboring areas of seas and oceans.

The exploitation of the power associated with wave motion normally takes place using generators that contain converters designed to transform the mechanical energy associated with the waves into electric power. There are many types of devices used, but in general, it should be pointed out that they are all suitable for exploiting waves with regular orientation caused by tides or constant winds, such as trade winds, or periodic winds, such as the monsoons, or simply the breezes, which accompany the motion of the sun daily. Regardless of the considerations relating to the intensity of the wave motion and its frequency at economically relevant levels, in order to maximize the power yield of the generators used and the rapid return on the investment made, one of the ways to obtain electric power from wave motion is to use floating bodies moored on the bottom of the sea or a basin normally hit by waves where such floating bodies contain a gyroscope inside a sealed chamber. The type of mooring must combine tensile strength and allow the floating body to orient itself according to the direction of propagation of the wave trains. For this purpose, the floating body often has an elongated shape or a sort of keel below; in this way, the floating body tends to pitch or oscillate around its own transverse axis and to orient itself more easily in the direction of wave propagation. With reference to the gyroscope, it is carried freely, axially rotatable by a frame, which, in turn, is carried by the floating body in a freely rotatable manner around a fixed axis, which is normally oriented along a longitudinal axis of the floating body. Naturally, the frame carries a motor connected to the gyroscope, the function of which is to keep it rotating at an adequate rotational speed, in particular, to associate a determined angular moment with the gyroscope. A converter is mechanically coupled to the frame and precisely designed to convert the oscillation mechanical energy of the frame into electrical energy. Any oscillation around the transverse axis of the floating body produces a rotation of the frame housing the gyroscope, which, due to its own movement inertia, tends to spontaneously return to the respective center position it would have under calm sea conditions in the shortest possible time.

It is easy to understand that the coincidence of the longitudinal axis of the floating body and the rotation axis of the frame is useful since the floating body moored at the bow tends to be arranged transversely to the wave trains, causing the frame housing the gyroscope to oscillate, thus generating renewable electric power.

With reference to the prior art, there are many known devices that produce electrical energy by exploiting wave motion. Many of these are described in public patent documents. Among these are Italian patent 0001394899 and corresponding European Patent EP 2,438,293. Each of these documents describes a device provided with a gyroscope coupled to actuators, suitable for producing electrical energy under conditions in which there are waves with random directions but unsuitable for operating under conditions in which the incident waves occur in different directions simultaneously. U.S. Pat. No. 7,906,865 describes a floating generator where the hull carrying the gyroscope is able to oscillate along the transverse axis while, for stability requirements, it has a reduced ability to oscillate along the longitudinal axis.

Patent application WO2019111040 describes a generator device in which a plurality of gyroscopes are carried in a distributed manner and in pairs along the direction of development of the floating body. The latter presents internally liquid containers at the bow and stern placed in hydraulic communication through pipes that, in fact, run between the bow and stern. The pipes are also provided with valves that condition the alternating movement of filling and emptying the liquid containers in such a way as to optimize the oscillation of the floating body in relation to the wave motion.

On the one hand, even if the generators illustrated above allow the floating body to adjust its orientation to the directions of the incident wave trains, this can only happen gradually. On the other hand, when the waves propagate in different directions and follow each other with non-periodic frequencies, the production of electrical energy is scarcely profitable, not to mention the wear due to non-productive oscillations of the frame that carries the gyroscope in such conditions. Briefly, it can be useful to point out that these are typical "cross sea" conditions, which easily develop in the seas that are confined between parallel and scarcely distant coasts, such as the Adriatic Sea.

As described above, the problem of optimizing the production of electric power where wave motion is often of the "cross" type is currently unsolved by the known solutions and, therefore, represents an interesting challenge for those who wish to build plants to produce electrical energy from sea waves in a profitable way, both in the context in which the average wave motion has a substantially constant direction and in the context in which the wave motion is mainly of the "cross" type.

In consideration of the situation described above, it would be desirable to have an electric power generator from marine waves or the like, which, in addition to limiting and possibly overcoming the typical drawbacks of the prior art illustrated above, defines a new standard for these types of plants.

SUMMARY OF THE DISCLOSURE

The present disclosure relates to a power generator. In particular, the present disclosure refers to an energy generator arranged to convert mechanical energy. More in detail, the present disclosure relates to an energy generator comprising a hull immersed at least partially in a liquid for the purpose of converting mechanical power associated with waves that propagate in the liquid into movement.

The problems set forth above are solved by the present disclosure. According to some embodiments of the present disclosure, a power generator is made comprising a box-shaped body provided with a hooking device designed to be connected to the ground through at least one cable; the body has an inner chamber containing a first gyroscopic device comprising a first frame hinged to the body around a first axis; a first gyroscope being carried by the first frame in a rotatable manner around a second axis perpendicular to the first axis; a first actuator being carried by the first frame to rotate the first gyroscope around the second axis; a first converter device of rotational mechanical power being mechanically coupled to the first frame; the first converter device being electrically connected to a stabilizing device; a second gyroscopic device comprising a second frame hinged to the body around a third axis transversal to the first axis. Validly, a second gyroscope is carried by the second frame in a rotatable manner around a fourth axis perpendicular to the third axis.

In some embodiments of the present disclosure, the generator comprises a second actuator associated with the second gyroscope to keep it rotating around the fourth axis in a determined way; a second device for converting rotational mechanical power into electric power being coupled to the second frame in an angularly fixed manner; the second converter device being electrically connected to the stabilizing device.

According to a possible constructional variant of the present disclosure, an electrical energy storage device is electrically connected to the stabilizing device.

In some cases, the body is axially symmetric with respect to a fifth axis transverse to the first axis and third axis.

In other cases, the body is fitted externally with devices that are shaped, in plane view, like circular crown arches and designed to float in a liquid.

Alternatively, the generator could comprise a wing device rigidly connected to the body to float in a gaseous fluid.

Advantageously, the wing device could comprise a kite connected to the body through at least one tie rod.

BRIEF DESCRIPTION OF THE DRAWINGS

Further characteristics and advantages of the generator according to the present disclosure will become clearer from the following description, shown with reference to the attached figures, which illustrate at least one non-limiting embodiment, in which identical or corresponding parts of the generator itself are identified by the same reference numbers.

FIG. 1 is a three-dimensional' schematic view of a generator according to the present disclosure.

FIG. 2 is a top view of the generator of FIG. 1 on an enlarged scale where the upper portion is missing, and parts are removed for clarity.

FIG. 3 is an enlarged side elevation view of a central portion of FIG. 2 with parts removed for clarity.

FIG. 4 is an axially sectioned side elevation view of FIG. 1 having an enlarged scale.

FIG. 6 is a schematic view of a variant of FIG. 1.

DETAILED DESCRIPTION OF THE DISCLOSURE

Figure 5:
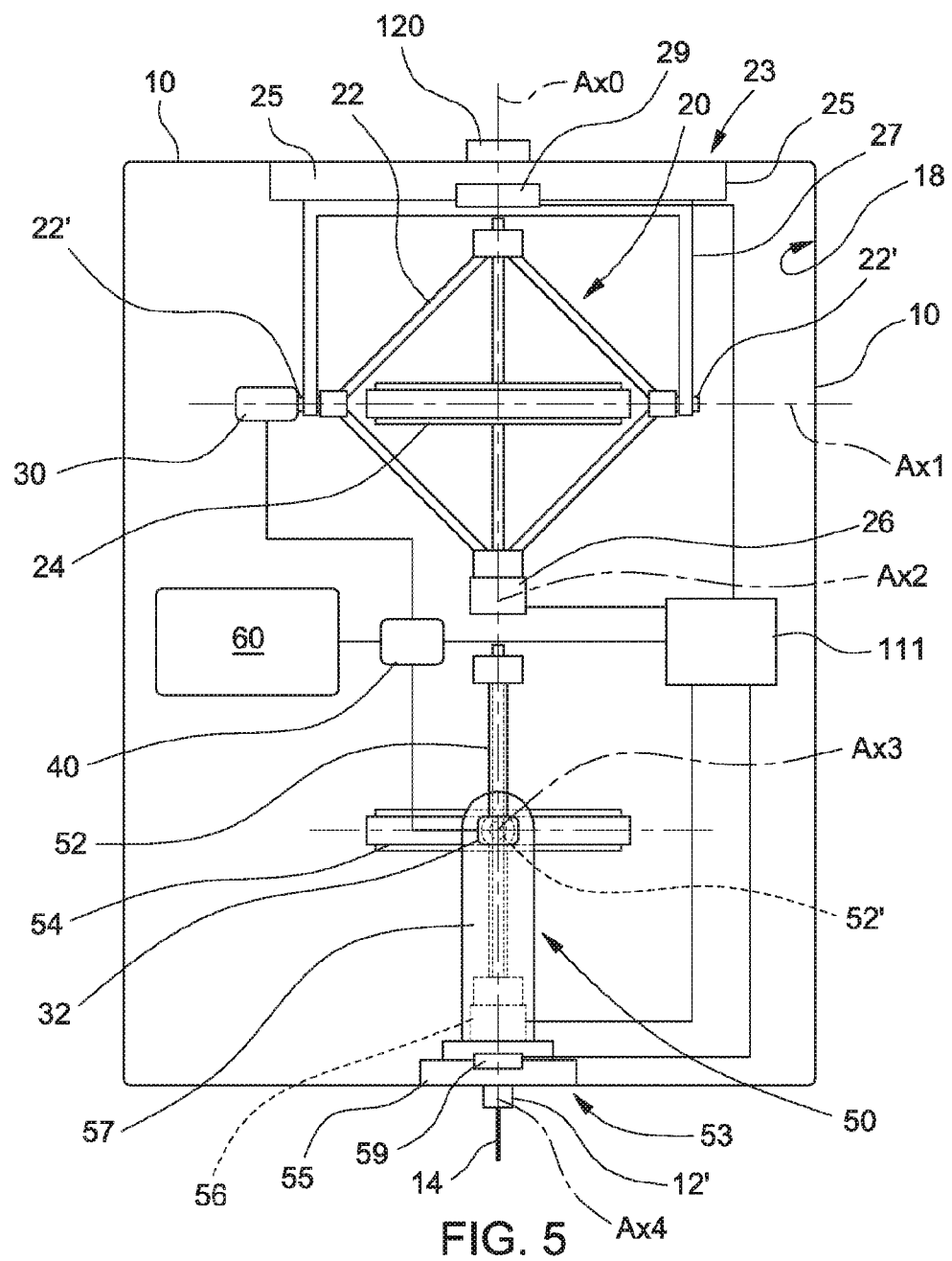
FIG. 5 is an axially sectioned side elevation view having an enlarged scale of a variant of the embodiment of FIG. 1.

In FIG. 1, the numeral 1 indicates, as a whole, an example of an electric power generator 1 according to the present disclosure. The generator 1 comprises a box-shaped body 10 provided with a ground reference device 12 comprising, with reference to FIGS. 4 and 5, a hooking member 12', designed to be connected to the ground through at least one cable 14. The body 10 has an inner chamber 18 containing a first gyroscopic device 20.

With reference to FIG. 3, the gyroscopic device 20 comprises a first frame 22 having a substantially rhomboidal shape, which is provided with respective first identical protrusions 22' extending outwards along a respective diagonal. The first frame 22 is hinged to the body 10 through the first protrusions 22' around a first axis AX1 that is fixed to the body 10, where this axis AX1 is radial for the body 10, and therefore transverse to an axis AX0, along which the box-shaped body 10, which is central and vertical in the attached figures, develops without thereby limiting the scope of the present disclosure. The gyroscopic device 20 further comprises a first gyroscope 24, which is carried by the first frame 22 in a rotatable manner around an axis AX2 perpendicular to the first axis AX1. The generator 1 also comprises a first actuator 26 carried by the first frame 22 according to a further diagonal to control the rotation of the first gyroscope 24 around the second axis AX2. Furthermore, the generator 1 comprises a first converter device 30 of rotational mechanical power into electric power, which is mechanically coupled to the first frame 22 in an angularly rigid and axially fixed manner. The first converter device 30 is electrically connected to a stabilizing device 40, which allows electric power to be produced by exploiting clockwise and counterclockwise undulations. On the other hand, the stabilizing device 40 is electrically connected to a battery 60 or to any other electrical energy storage device or, directly or through a converter, to an electric current distribution network.

With particular reference to FIGS. 2, 3, and 4, the generator 1 also comprises a second gyroscopic device 50 comprising a second frame 52, which in the present embodiment has been thought substantially identical to the first frame 22 without thereby limiting the scope of the present disclosure. In particular, the second frame 52 has a substantially rhomboidal shape and is provided with respective first identical protrusions 52' extending outwards along a respective diagonal and coaxial to a third axis AX3 which is radial and fixed for the body 10, transverse to the first axis AX1 and to the axis AX0. The second frame 52 is hinged to the body 10 around the third axis AX3 and carries a second gyroscope 54 in a rotatable manner around a fourth axis AX4 perpendicular to the third axis AX3.

In association with the second gyroscopic device 50, the generator 1 comprises, similar to the first gyroscopic device 20, a second actuator 56 carried by the second frame 52 according to a further diagonal to keep the second gyroscope 54 rotating around the fourth axis AX4 in a determined way. The generator 1 also comprises a second converter device 32 of rotational mechanical power into electric power coupled to the second frame 52 in an angularly rigid and axially fixed manner. The second converter device 32 is also electrically connected to the stabilizing device 40 to supply electric power to the battery 60.

With particular reference to FIGS. 1 and 2, the body 10 is fitted externally with devices 100 that are shaped, in plane view, like circular crown arches and produced with floating material in order to increase the external volume of the generator 1 and, therefore, to increase the ability thereof to float in a liquid even under particularly harsh sea conditions, to absorb more energy from wave motion, and to decrease its resistance to oscillating under the thrust of a wave perturbation.

The use of the generator 1 can be easily understood from what has been described above and does not require further explanation. On the other hand, it can be useful to specify that, considering a generator 1 in which the body 10 is connected to the bottom of the sea by a mooring cable 14, wave motion of "cross sea" types will produce movements on this body 10 around the two axes AX1 and AX3 which, without considering the vertical component of motion correlated to the wave motion, will induce oscillations of the first gyroscopic device 20 and the second gyroscopic device 50 with respect to these axes, influencing the operation thereof and, therefore, will activate the respective first converter device 30 and second converter device 32, with the consequence that they will produce electric power that the stabilizing device 40 will transform in such a way as to supply the battery 60 or, directly, the electrical network, according to the design specifications of the generator 1.

Furthermore, it is considered useful to add that in FIGS. 2, 3, and 4, the first and second gyroscopic devices 20 and 50 have been illustrated in a state of rest, in which the axes AX2 and AX4 are coincident with the axis AX0 fixed for the body 10. It is easy to understand that this operating condition is scarcely probable, given that the bodies of water are never static so that the first and second frames 22 and 52 of the generator 1 will practically always oscillate, producing electric power in a substantially continuous manner, regardless of the direction of the incident waves.

On the other hand, it is useful to specify that the first actuator 26 and the second actuator 56 can be of the type with a fixed speed of rotation or with an adjustable speed of rotation. In this second case, the respective speeds can be adjusted instant by instant in such a way as to help vary the angular momentum of the respective first gyroscope 24 and second gyroscope 54 in order to take part in the conversion and/or stabilization of the electric power flows to the stabilizing device 40.

Finally, it is clear that modifications and variations can be made to the generator 1 described and illustrated here without thereby departing from the protective scope of the present disclosure.

For example, one could think of making at least one of the first and second gyroscopic devices 20 and 50 presenting the respective first or second frame 22/52 freely rotatable with respect to the body 10. This construction type would allow tuning at least one gyroscopic device on wave components with different directional and/or spectral characteristics provided that at least one of the rotation axes AX1 and AX3, respectively, of the first frame 22 and of the second frame 52 is free to orient itself around the axis AX0. In particular, in the case of a predominantly one-way climate, being able to have at least one of the first and second gyroscopic devices 20 and 50 rotatable with respect to the axis AX0 would allow orienting at least one of the axes AX1 and AX3 to focus all the wave extraction capacity of the generator 1 on a single wave. An example of such an embodiment is shown in FIG. 5, where both the first and second gyroscopic devices 20 and 50 are carried by the body 10 through a support that is rotatable around the axis AX0 or parallel thereto.

In this regard, in FIG. 5, the first frame 22 and the second frame 52 are rotatably carried by the body 10 around the respective axis AX0 through the respective first support 23 and second support 53, which engage the relative first protrusions 22' and second protrusions 52'. Each of these first and second supports 23 and 53 comprises a first base 25 and a second base 55 permanently carried by the body 10 and a first fork portion 27 and a second fork portion 57, respectively rotatably coupled to the first base 25 and to the second base 55. In this way, the first gyroscopic device 20 and the second gyroscopic device 50 are free to orient themselves according to distinct and independent directions, in the absence of other stresses according to the direction of the dominant wave motion inside the body 10. On the other hand, if one wished to condition the rotation of the first and second gyroscopic devices 20 and 50, one might think of equipping them with a respective third actuator 29 and fourth actuator 59 with electronic control, coaxial to the axis AX0 or at least parallel thereto, where the third and fourth actuators 29 and 59 can be electronically operated by the signal of a control unit 111, precisely for the purpose of orienting the first gyroscopic device 20 and the second gyroscopic device 50 at will with respect to the body 10 in order to focus all the wave extraction capacity of the generator 1 through such devices on a single wave in case of predominantly one-way climate.

In a known and not illustrated way, the control unit 111 will be able to integrate a series of motion sensors of the body 10 for the six degrees of freedom in order to be able to evaluate the statistical average parameters of the incident wave climate and make a prediction of the wave through, for example, neural networks and AR algorithms, in order to adapt the actions to the conditions with no need for external tools, increasing the reliability of the system. Of course, the control unit 111 can, in turn, be part of a management system that records information on the wave climate, for example, but not limitedly by means of wave-meter buoys and marine meteorological forecasting systems, and receive such information to condition the positioning of at least one of the first and second gyroscopic devices 20 and 50.

On the other hand, the control unit 111 could be operatively designed to act on the stabilizing device 40, on the first actuator 26, and on the second actuator 56 through the respective management systems known and not illustrated, as well as on the third and fourth actuators 29 and 59, in order to achieve the reference objectives. The objectives can be, by way of non-limiting example, to maximize the power produced by the generator 1, to stabilize the electrical network to which the generator 1 is connected, to stabilize the body 10, or to maximize the operating life of the generator 1.

Furthermore, according to another possible construction variant, it could be useful to specify that the possibility of multiplying the number of the first and second gyroscopic devices 20 and 50 inside the body 10 is permitted by positioning them side by side, for example, by placing the pairs of gyroscopic devices in a radial pattern with axes orthogonal with respect to the axis AX0, without thereby departing from the scope of protection of the present disclosure.

Furthermore, with reference to FIG. 6, the generator 1 could be decomposed, and the members 100 could be removed to connect the body 10 in a rigid manner to a wing device 70 in order to make it suitable for floating in a gaseous fluid 64.

Still, according to FIG. 6, the wing device 70 could advantageously freely fly in the air and, for this purpose, comprise a kite 72 connected to the body 10 by at least one tie rod 74. The evolutions of the kite 72 would produce stresses on the body 10 similar to those produced on the body 10 in FIGS. 1-4 by a wave motion of any type.

It can be useful to specify that up to this point, the description has been referred to energy exchanges whose effect is to produce electric power. On the other hand, the generator 1 can be used to produce mechanical work in the form of flows of hydraulic or pneumatic energy without thereby departing from the scope of protection of the present disclosure. To do this, it is easy to understand that the first actuator 26 and the second actuator 56, the third actuator 29, the fourth actuator 59, the first converter device 30 and the second converter device 32, and the stabilizing device 40 and the battery 60 must be replaced with equivalent devices capable of managing energy flows of a fluid dynamic or hydraulic nature.

Finally, the reference device 12 can comprise, in addition or as an alternative to the hooking member 12' and the respective cable 14, a GPS receiver 120 (illustrated in FIG. 4 on the top of the body 10), which allows geographical identification of the instantaneous position of the generator 1 in such a way as to allow its continuous geographical availability. This type of solution allows the generator 1 to be of the freely floating type, similar to a buoy for measuring data regarding the condition of the sea in free circulation on routes defined exclusively by winds and currents.

According to what has been described above, the generator 1 of any of the two versions described above solves the technical problem set forth above in a simple and economical way, being effectively usable in rough seas or particularly turbulent winds.

The invention claimed is:

1. A wave power generator configured to convert waves propagating in a liquid into electric power, the wave power generator comprising:
    a body that is box-shaped having an inner chamber;
    a first gyroscopic device contained in the body, the first gyroscopic device comprising a first frame hinged to the body around a first axis through respective first protrusions coaxial to the first axis, a first gyroscope carried by the first frame in a rotatable manner around a second axis perpendicular to the first axis, a first actuator carried by the first frame and operably configured to rotate the first gyroscope around the second axis, a first converter device being mechanically coupled to the first frame,
    wherein the first converter device converts rotational mechanical energy and is connected to a stabilizing device; and
    a second gyroscopic device comprising a second frame hinged to the body around a third axis that is transversal to the first axis through respective second protrusions coaxial to the third axis.

2. The wave power generator according to claim 1, wherein the second gyroscopic device comprises a second gyroscope carried by the second frame rotatable around a fourth axis that is perpendicular to the third axis.

3. The wave power generator according to claim 2, further comprising:

a second actuator operably configured and associated with the second gyroscope to keep the second gyroscope rotating around the fourth axis in a predetermined way; and
    a second mechanical rotation energy converter device coupled to the second frame in an angularly fixed manner,
    wherein the second mechanical rotation energy converter device is connected to the stabilizing device.

4. The wave power generator according to claim 3, further comprising:
    an energy storage device connected to the stabilizing device.

5. The wave power generator according to claim 3, wherein at least one of the first actuator and the second actuator has an adjustable rotation speed.

6. The wave power generator according to claim 1, wherein at least one of the first axis and the third axis is fixed to the body.

7. The wave power generator according to claim 1, wherein at least one of the first axis and the third axis is rotatable relative to a fifth axis that is transverse to the first axis and the third axis.

8. The wave power generator according to claim 7, further comprising:
    a first support for the first frame that comprises a first base permanently carried by the body and a first fork portion rotatably supported by the first base around the fifth axis,
    wherein first fork portion carries the first frame through the first protrusions.

9. The wave power generator according to claim 8, wherein the first support comprises:
    a third actuator operably configured to be electronically controlled and coaxial or parallel to the fifth axis; and
    a control unit connected to the third actuator to adjust an orientation of the first fork portion relative to the body.

10. The wave power generator according to claim 9, further comprising:
    a second support for the second frame that comprises a second base permanently carried by the body and a second fork portion rotatably supported by the second base around the fifth axis,
    wherein the second fork portion carries the second frame through the second protrusions.

11. The wave power generator according to claim 10, wherein the second support comprises:
    a fourth actuator operably configured to be electronically controlled and coaxial or parallel to the fifth axis,
    wherein the control unit is connected to the fourth actuator to adjust an orientation of the second fork portion relative to the body.

12. The wave power generator according to claim 11, further comprising:
    a plurality of motion sensors for the body for six degrees of freedom electronically connected to the control unit configured to evaluate average statistical parameters of a wave climate that is incident to the body.

13. The wave power generator according to claim 12, wherein the control unit is part of a management system that records information on the wave climate with wave-meter buoys and marine meteorological forecasting systems.

14. The wave power generator according to claim 9, wherein the control unit is connected with the stabilizing device to the first actuator and to a second actuator.

15. The wave power generator according to claim 1, wherein the first and second converter devices and the stabilizing device are configured to manage flows of electric, hydraulic or pneumatic energy.

16. The wave power generator according to claim 1, wherein the body is axially symmetric relative to a fifth axis that is transverse to the first axis and the third axis.

17. The wave power generator according to claim 1, wherein the body is externally fitted with devices having a circular crown arch shape and being configured to float in a liquid.

18. The wave power generator according to claim 1, further comprising:
   a wing device rigidly connected to the body and configured to float in a gaseous fluid.

19. The wave power generator according to claim 18, wherein the wing device comprises a kite connected to the body by at least one tie rod.

20. The wave power generator according to claim 1, further comprising:
   a ground reference device coupled to the body.

21. The wave power generator according to claim 20, wherein the ground reference device is configured to connect the body to the ground with at least one cable.

22. The wave power generator according to claim 21, wherein the ground reference device comprises a GPS receiver.

* * * * *